Patented Dec. 15, 1942

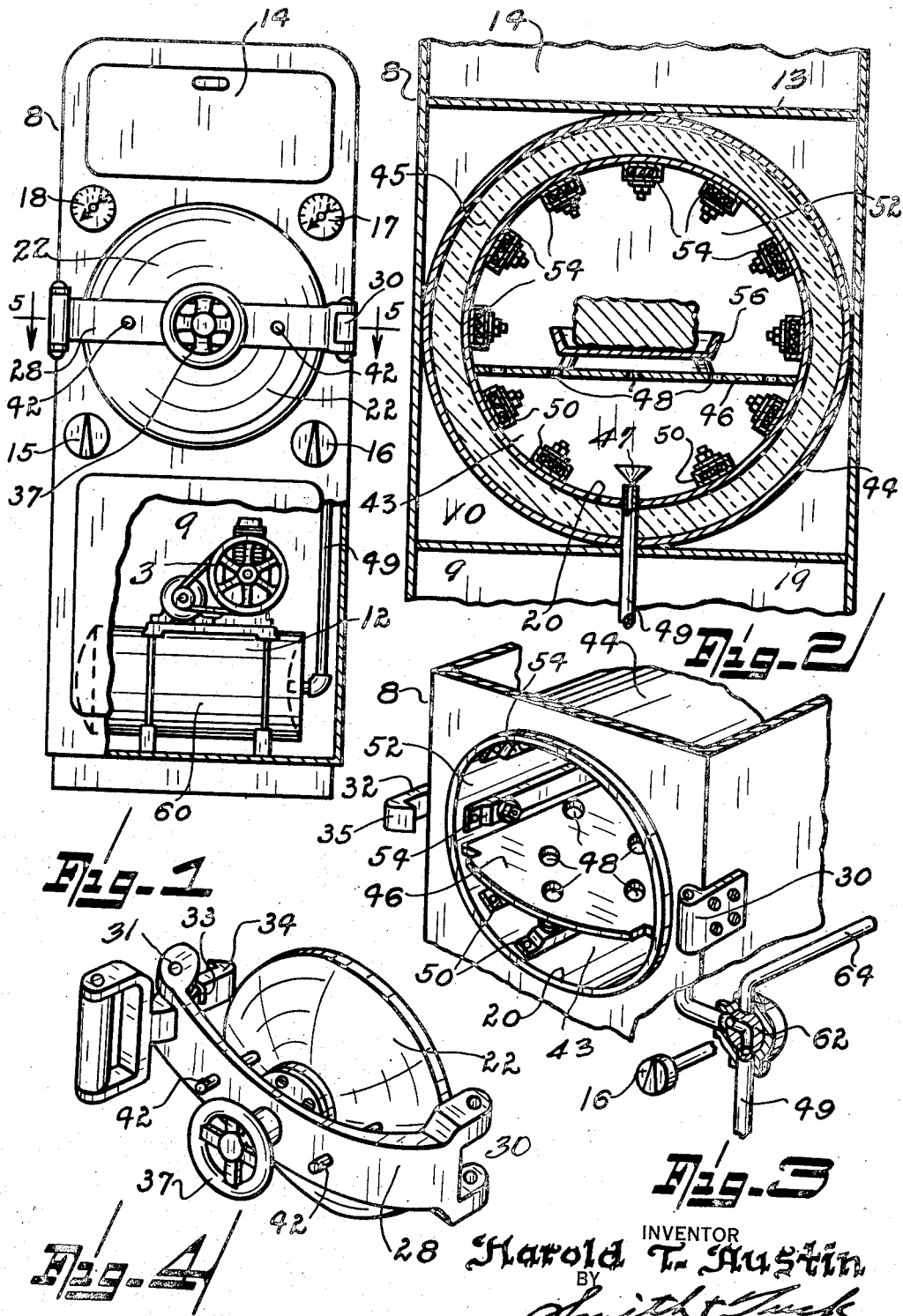

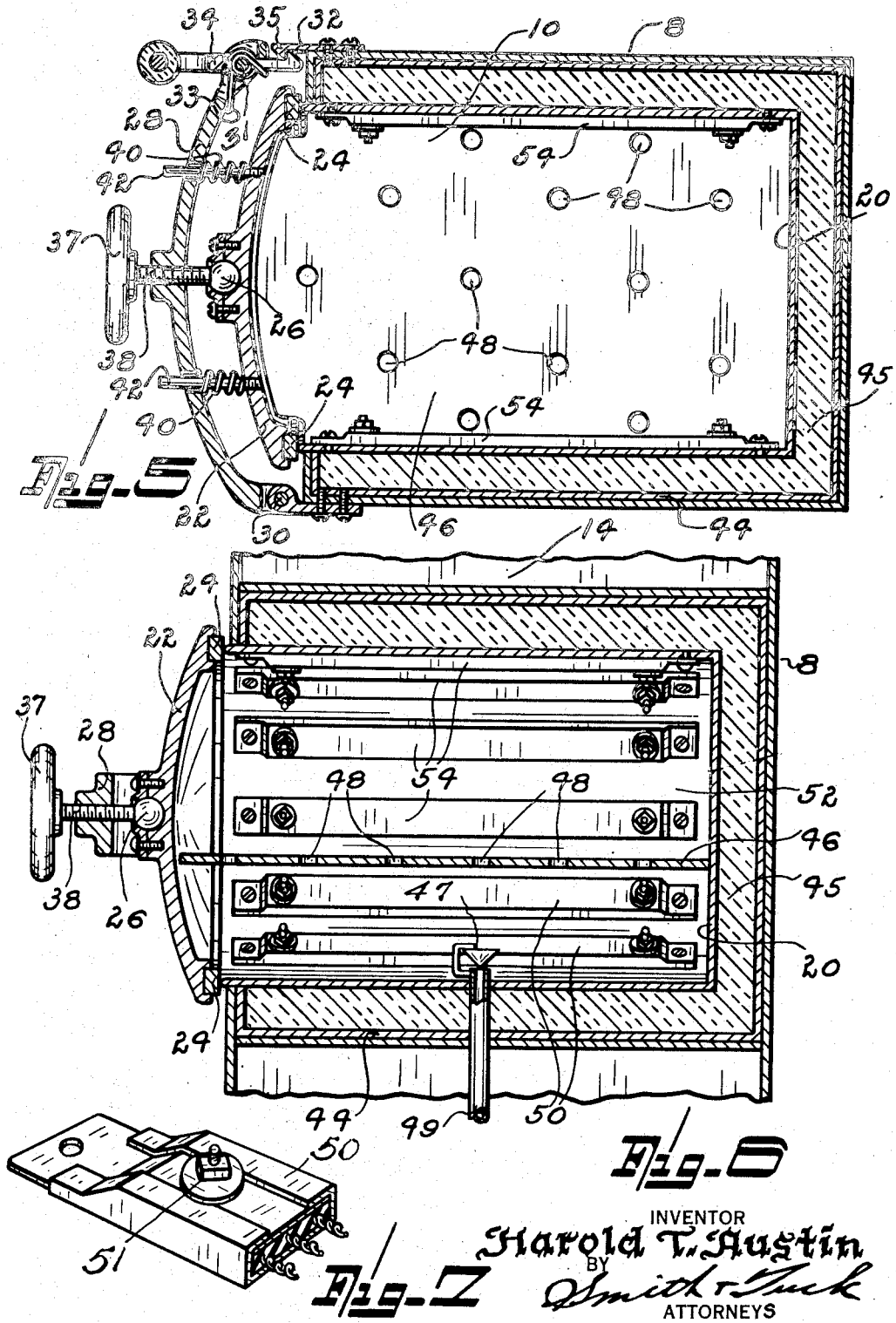

2,305,056

UNITED STATES PATENT OFFICE 2,305,056

COOKING APPLIANCE

Harold T. Austin, Seattle, Wash., assignor to Patents, Inc., a corporation of Washington Application June 12, 1939, Serial No. 278,771

1 Claim. (Cl. 219—35)

My present invention relates to an improved cooking appliance involving an oven, which is internally heated, and also provided with a supply of compressed air, for operations of baking, roasting etc. at the proper cooking temperature, without the use of moisture beyond the moisture contained in the food or food product to be cooked.

In carrying out my invention I utilize a hollow cylindrical oven which is provided with interior electric heating units controlled by a suitable exterior switch, which electric heating units may be employed under some circumstances as the sole heating means for the oven. Compressed air, heated by compression to a suitable cooking temperature may also be employed as the sole heating agent; and under other conditions, as for instance with a comparatively low degree of compressed air, the electric heating units may be jointly used with the compressed air for the proper cooking temperature, and especially for browning meat and other food being cooked within the oven.

By the utilization of my invention as embodied in the oven and its accessories, the appliance as a whole is reduced to compact size and occupies a minimum space, and at the same time the dry cooking temperature employed prepares the baked or roasted food or food products for the table in an unusually short period of time.

The invention consists in certain novel combinations and arrangements of parts as will hereinafter be more fully set forth and claimed.

In the accompanying drawings I have illustrated one complete example of the physical embodiment of my invention wherein the parts are combined and arranged according to one mode I have thus far devised for the practical application of the principles of my invention, but it will be understood that changes and alterations may be made in these exemplifying structures, within the scope of my claims, without departing from the principles of my invention.

Figure 1 is a front elevation of the cooking appliance of my invention, partly broken away to show the air compressor and air supply tank, with the oven door closed and sealed, together with the electric switch, the air control valve, the air pressure gage, and a remote thermometer to indicate the cooking-temperature within the oven.

Figure 2 is an enlarged vertical sectional view at the central portion of the appliance, showing the cylindrical, jacketed, oven with its electrical heating units, and the compressed air nozzle with its distributing jet or cap in the lower heating chamber, together with the horizontal, perforated, food-supporting plate with a tray and food thereon.

Figure 3 is a perspective view showing a portion of the housing, and the front interior of the oven with the door omitted, together with a sectional detail of the three-way air valve that controls admission of compressed air to the oven, and also vents the interior of the oven.

Figure 4 is a detached perspective view of the oven door and its accessories.

Figure 5 is a horizontal sectional view at line 5—5 of Figure 1, showing the jacketed oven, the closed and sealed door, and the interior supporting plate or partition in the oven.

Figure 6 is a vertical sectional view, longitudinally of the oven, showing the electrical heating units therein, the compressed air intake nozzle and the jet-spreader or distributing cap, together with the latched and sealed door.

Figure 7 is a perspective view of a portion of one of the heating units, showing the interior construction of the heating element.

In the general assembly view of Figure 1 I have shown a front elevation of the appliance including an exterior upright housing or cabinet, as 8, having an interior bottom compartment 9 in which the air compressor 3 is located for compressing in tank 60 the required supply of air at the desired cooking-temperature, as indicated by the thermometer 17 that is remotely located at a suitable point for this purpose, and the air-pressure within the oven is indicated by the gage 18. The handle for the three-way air control valve is indicated in Figures 1 and 3 as 16, and an air pressure gage is indicated at 18 in Figure 1.

The oven is mounted in an intermediate compartment 10 of the housing, which compartment is formed with a closed upper plate 13 to form the bottom of an upper storage or warming chamber 14 in the top of the housing or cabinet 8, and the plate 19 forms a separating partition between the air-compression compartment 9 and the oven compartment 10.

The cylindrical oven as shown is fashioned with an exterior wall 44 that is rigidly supported in its compartment 10, a concentric wall 20, and an intermediate heat insulation filling 45, the outer wall and the intermediate filling forming a brace for the oven as well as insulating the oven against loss of heat from its interior. The cylindrical oven including its jacket 44—45 is thus provided with substantial walls within the housing that resist the relatively high air pressure admitted thereto and the packing 45 forming part of the jacket is a non-conductor of heat, as rock wool, asbestos wool, or other suitable heat-insulating material.

The open front of the oven, as seen in Figures 3, 5, and 6, projects slightly with its circular edge in front of the housing to receive the annular resilient gasket 24 of the hinged door 22 of the oven, and as shown the upright door is concavo-convex in shape to project in front of the housing and to provide added space within the oven. The door is not directly hinged to the housing, but is loosely mounted on a hinged yoke or arm 28 that is hinged at 30, in a horizontal plane, with the hinge joint mounted exterior of one of the housing walls. When in closed and latched position, the door is tightly sealed by the resilient gasket 24 through the use of threaded coupling that includes the ball and socket joint 26 in the outer face of the door, the screw bar 38 rigid with the ball and threaded in the hinge yoke, and the hand wheel 37 rigid with the bar and located exterior of the yoke.

The free end of the yoke 28, when the door 22 is closed, is latched to the housing, which is provided with a keeper 32, 35 and this free end of the yoke is provided with a combined latch and handle including a coiled spring 33 which tends to close the head of the latch behind the keeper head 35. The latch is pivoted at 31 on the yoke 28, and the spring is coiled about the pivot pin with its respective ends bearing against the yoke and the inner side of the latch. Thus, the yoke, with the door mounted thereon, by grasping the handle of the latch, is swung to closed and latched position, and by first swinging the latch loose, the door may be swung open with the swinging movement of the yoke.

To assist in supporting the door on its yoke, and to guide the door, accurately, into closed position, coiled springs 40 are mounted on pins 42 which pins are rigidly mounted on the exterior of the door, at opposite sides of the ball and socket joint 26. The pins are interposed between the door and the yoke and the free ends of the pins pass through apertures in the yoke. Thus, after the door is swung to closed position and the latch engaged, the hand wheel 37 is turned and the door is sealed by its gasket 24 against escape of air from the interior of the oven. These springs 40 also serve to maintain the door in proper relation to the yoke when the door is open in connection with the pins 42, and the springs provide for an initial movement to the door as it is being closed.

Below the horizontal or longitudinal axis of the interior of the oven 20 I mount a horizontal partition 46 of suitable material which, as seen in Figures 5 and 6 has its front end projecting into the concave portion inside the door 22, which forms a lower heating chamber 43 and the upper cooking chamber 52, within the oven. The partition is perforated as at 48 to permit upward flow of heated air, under compression from the heating chamber, and the compressed air pipe 49 from tank 60 in Figure 1 enters through the bottom of the jacketed cylinder or oven, as in Figures 2 and 5. As seen in Figs. 2 and 5 the nozzle end of the pipe 49 projecting into the heating chamber is provided with a flaring jet-distributing head 47 mounted over the nozzle and designed to distribute the inflowing air throughout the heating chamber 43 and prevent direct flow of the air through the foraminous supporting plate 46 by way of the holes 48.

In the heating chamber a number of "strip heaters" or electric heating units 50 are arranged in parallelism, spaced slightly apart and extending parallel with the longitudinal axis of the oven. These heating units are fixed to the inner face of the oven-cylinder 20, and their end terminals 51 are connected in suitable manner to a source of electric supply, which is controlled by the exterior electric switch 15 in Figure 1. The heated compressed air passes upward through holes 48 in the oven-plate 46 into the cooking chamber 52.

The cooking chamber 52 also has a series of "strip heaters" or electric heating units 54 similar to the units 50 in the heating chamber, and the supply of electricity to these units may be controlled by the switch 15.

By means of a three-way valve 62 (Fig. 3) the admission of air under compression passing through pipe 49 to the heating chamber may be controlled, the valve in Fig. 3 being shown as open to the heating chamber. The valve is turned by the handle 16, and it may be turned to shut off the main portion of the tank line 49 to the tank 60, and at the same time connect a vent pipe 64 with the interior of the heating chamber, when necessary.

The oven-plate 46 is adapted to receive and support a cooking tray 56 (Fig. 2) with food thereon for roasting and baking, and where a relatively low air-pressure is employed in the cooking chamber, the heating units 54 in the cooking chamber may be energized to insure ample heat or a desired cooking-temperature.

These "strip heaters" operate by radiant energy to heat the cooking chamber, and under these conditions the meat or other food product in the tray 56 may be browned to the desired degree.

Usually the electric heating elements 50 in the heating chamber are first turned on, the tray 56 is slid into place, and the oven door is closed and sealed. Compressed air from the tank 60 at a working pressure between fifty and a hundred pounds is then introduced to the heating chamber and flows upward through the foraminous or perforated oven plate into the cooking chamber to bring the cooking temperature to the desired degree.

The electric switch is employed to energize the required number of heating units, and the air valve is used to control the admission of compressed air to the oven, these control parts being governed by the indications of the thermometer 17 which show the cooking temperature in the oven.

Various foods are cooked at variable cooking temperatures, and under various air pressures, and the thermometer indicates the proper control of the electric switch 15 and the air valve 16. In some instances, the air compressed in tank 60, and heated by such compression to a high degree, may be employed as the cooking agent; at a low air pressure of air more radiant heat from the strip heaters is employed to provide the proper cooking temperature; and in other instances the full complement of strip heaters in the groups 50 and 54 may be used.

Having thus fully described my invention, what I claim as new and desire to secure by Letters Patent is:

The combination in a cooking appliance comprising an oven having a perforated plate forming an interior lower pre-heating chamber and an upper cooking chamber, and radiant heater elements in said oven, means including a nozzle for introducing compressed air into the pre-heating chamber, a jet-distributing head above the nozzle for distributing the compressed air throughout the pre-heating chamber, and means for controlling the admission of air through the nozzle.

HAROLD T. AUSTIN.